(12) United States Patent
Doyle et al.

(10) Patent No.: US 10,957,971 B2
(45) Date of Patent: Mar. 23, 2021

(54) FEED TO WAVEGUIDE TRANSITION STRUCTURES AND RELATED SENSOR ASSEMBLIES

(71) Applicant: VEONEER US, INC., Southfield, MI (US)

(72) Inventors: Scott B. Doyle, Sudbury, ME (US); Angelos Alexanian, Lexington, ME (US); Konstantinos Konstantinidis, Wurzburg (DE)

(73) Assignee: Veoneer US, Inc., Southfield, MI (US)

( * ) Notice: Subject to any disclaimer, the term of this patent is extended or adjusted under 35 U.S.C. 154(b) by 0 days.

(21) Appl. No.: 16/520,223

(22) Filed: Jul. 23, 2019

(65) Prior Publication Data

US 2021/0028537 A1   Jan. 28, 2021

(51) Int. Cl.
| | |
|---|---|
| *H01Q 1/32* | (2006.01) |
| *G01S 7/03* | (2006.01) |
| *G01S 13/931* | (2020.01) |
| *H01Q 13/22* | (2006.01) |
| *H01Q 21/00* | (2006.01) |
| *H01Q 5/55* | (2015.01) |

(52) U.S. Cl.
CPC ........... *H01Q 1/3233* (2013.01); *G01S 7/032* (2013.01); *G01S 13/931* (2013.01); *H01Q 5/55* (2015.01); *H01Q 13/22* (2013.01); *H01Q 21/0062* (2013.01)

(58) Field of Classification Search
CPC .... H01Q 1/3233; H01Q 1/3208; H01Q 13/22; H01Q 13/06; H01Q 5/55; H01Q 21/0062; H01Q 21/06; G01S 7/032; G01S 13/931; H01P 3/12; H01P 5/107; H01P 5/08
See application file for complete search history.

(56) References Cited

U.S. PATENT DOCUMENTS

| | | | |
|---|---|---|---|
| 7,132,905 B2 | 11/2006 | Sano | |
| 8,779,995 B2 | 7/2014 | Kirino et al. | |
| 8,803,638 B2 | 8/2014 | Kildal | |
| 9,153,851 B2 | 10/2015 | Nakamura | |
| 9,252,475 B2 | 2/2016 | Milyakh et al. | |
| 9,666,931 B2 * | 5/2017 | Suzuki | H01P 5/107 |

(Continued)

FOREIGN PATENT DOCUMENTS

| | | |
|---|---|---|
| CN | 102931492 | 2/2015 |
| CN | 106207357 | 12/2016 |

OTHER PUBLICATIONS

CN102931492, Feb. 11, 2015, Beijing Institute of Telemetry Technology, Machine Translation (9 pages).

(Continued)

*Primary Examiner* — Daniel D Chang
(74) *Attorney, Agent, or Firm* — Matthew D. Thayne; Thayne and Davis LLC (57) ABSTRACT

Waveguide module assemblies for vehicles, such as radar sensor waveguide feed to waveguide transition assemblies. In some embodiments, an antenna module may comprise an antenna assembly that includes a resonating element and a waveguide component that defines, at least in part, a waveguide configured to guide electromagnetic energy radiating from the resonating element. The resonating element of the antenna assembly may directly feed electromagnetic energy into the waveguide defined by the waveguide component.

20 Claims, 6 Drawing Sheets

(56) References Cited

U.S. PATENT DOCUMENTS

| | | | |
|---|---|---|---|
| 10,164,344 B2 | 12/2018 | Kirino et al. | |
| 2011/0050356 A1* | 3/2011 | Nakamura | H01P 5/107 333/26 |
| 2016/0268693 A1 | 9/2016 | Ding et al. | |
| 2017/0187121 A1 | 6/2017 | Kirino et al. | |
| 2017/0187124 A1 | 6/2017 | Kirino et al. | |
| 2018/0342797 A1 | 11/2018 | Pan et al. | |
| 2018/0351261 A1* | 12/2018 | Kamo | H01Q 21/064 |
| 2019/0057945 A1 | 2/2019 | Maaskant et al. | |
| 2019/0089042 A1 | 3/2019 | Purden et al. | |

OTHER PUBLICATIONS

CN106207357, Dec. 7, 2017, Chengdu Xanaway Technology Co., Ltd., Machine Translation (58 pages).

Dec. 8, 2020 PCT/US2020/042829 International Search Report (3 pgs).

Dec. 8, 2020 PCT/US2020/042829 Written Opinion (7 pgs).

* cited by examiner

FEED TO WAVEGUIDE TRANSITION STRUCTURES AND RELATED SENSOR ASSEMBLIES

SUMMARY

Disclosed herein are various embodiments of sensor and/or waveguide modules comprising waveguide structures for guiding electromagnetic energy. In preferred embodiments, such modules may comprise radar sensor modules for vehicles, including one or more novel and inventive features disclosed herein.

In some embodiments disclosed herein, a waveguide module may comprise a feed component defining a resonating element such as a resonating patch and/or antenna and a waveguide component having waveguide structures formed therein. For example, one or more waveguides may be defined, at least in part, by the waveguide component, in some cases with a waveguide ridge formed therein. In some embodiments, the waveguide may be defined by a plurality of posts that may be formed in rows on opposite sides of the waveguide.

In a more particular example of a waveguide module, such as a vehicle radar module according to some embodiments, the module may comprise a feed component that may include a conductive ground layer, a conductive top layer, and a substrate disposed between the conductive ground layer and the conductive top layer. In some embodiments, the substrate may comprise a dielectric material. The conductive ground layer, the conductive top layer, and the substrate of the feed component may comprise layers of a printed circuit board ("PCB") forming, at least in part, the feed component.

In some embodiments, the conductive top layer of the feed component may comprise a first portion defining a resonating patch. The resonating patch may be coupled to a feed input of the waveguide module by a feed. In certain embodiments, the feed input may comprise a feed port of the waveguide module.

A variety of suitable types and/or configurations of resonating patches and/or feeds may be used in connection with the disclosed embodiments. For example, the resonating patch may comprise a square patch, a rectangular patch, a circular patch, a triangular resonating patch, an elliptical resonating patch, a hexagonal resonating patch, a pentagonal resonating patch, a rhomboid resonating patch, a ring resonating patch (e.g., a square and/or circular ring resonating patch and/or the like), /or any other suitably configured patch having any suitable dimensions, configuration, and/or shape. In various embodiments, the resonating patches may comprise any suitably shaped patch having at least one dimension that is resonant in a desired resonance frequency.

Electromagnetic energy may be provided to the resonating patch via the feed. In some embodiments, the feed may comprise at least one of a coplanar waveguide, a microstrip feed line, a strip feed line, an aperture coupled feed, a proximity coupled feed, a coaxial feed, and/or any other suitably configured feed.

In some embodiments, the feed may be electrically coupled to the resonating patch and be configured to directly feed the resonating patch with electromagnetic energy. In some embodiments, the feed may be defined by the first portion of the conductive top layer of the waveguide module and be electrically connected with the resonating patch defined by the first portion of the conductive top layer. For example, the first portion of the conductive top layer may define a microstrip line electrically coupling the resonating patch with the feed input of the waveguide module.

In further embodiments, the feed may be configured to provide electromagnetic energy to the resonating patch via electromagnetic coupling. For example, the feed may comprise a proximity coupled feed structure configured to feed energy to the resonating patch via electromagnetic coupling between the resonating patch and a feed structure, which may itself comprise a resonating feed structure. In some embodiments, the feed may be defined in one or more other layers and/or structures forming the feed component.

In some embodiments, the conductive top layer of the feed component may further comprise a second portion. The second portion may be electrically isolated from the first portion and coupled to the conductive ground layer of the feed component. For example, one or more conductive vias may be defined in the substrate of the feed component that electrically couple the second portion of the conductive top layer of the feed component with the conductive ground layer of the feed component. In certain embodiments, the one or more conductive vias may be formed to surround at least a portion of the first portion of the conductive top layer. For example, in some embodiments, the one or more conductive vias may be formed to surround at least a portion of the resonating patch and/or a feed defined by the first portion of the conductive top layer.

The waveguide module may further comprise a waveguide component. In some embodiments, in the assembled waveguide module, the resonating patch of the feed component may directly feed electromagnetic energy into a waveguide defined, at least in part, by the waveguide component.

In some embodiments, the waveguide component may comprise one or more waveguides configured to guide the propagation of electromagnetic energy radiated by the resonating patch within the waveguide. In some embodiments, the one or more waveguides may be, at least partially or wholly, defined by a plurality of posts formed by the waveguide component. In some embodiments, the plurality of posts may comprise at least a first row of posts defining a first side of the waveguide and at least a second row of posts defining a second side of the waveguide opposite the first side of the waveguide.

In some embodiments, the at least a first row of posts defining the first side of the waveguide may comprise a plurality of rows of posts. The plurality of rows of posts may be staggered relative to each other such that posts in a first row of the at least a first row of posts are positioned adjacent to gaps between adjacent posts in a second row of the at least a first row of posts or may be aligned with the adjacent posts so that the gaps are also aligned with one another.

In some embodiments, the at least a second row of posts defining the second side of the waveguide may also comprise a plurality of rows of post. The plurality of rows of posts may be staggered relative to each other such that posts in a first row of the at least a second row of posts are positioned adjacent to gaps between adjacent posts in a second row of the at least a second row of posts or may be aligned with the adjacent posts so that the gaps are also aligned with one another.

In some embodiments, the waveguide component may further comprise at least one termination post. In some embodiments, the at least one termination post may be formed at an end of the waveguide component opposite a waveguide output of the waveguide module. The waveguide output of the waveguide module may comprise a waveguide port. The at least one termination post may, in some embodiments, be formed proximate to the feed (and/or a feed line associated with the same) of the waveguide module. In various embodiments, the at least one termination post may be configured to mitigate and/or substantially mitigate the propagation of electromagnetic radiation within the waveguide in a direction away from the waveguide output of the waveguide module. In this manner, the at least one termination post may, at least in part, guide electromagnetic energy within the waveguide towards the waveguide output of the waveguide module.

In some embodiments, the at least one termination post may comprise at least one feed line termination post that may be shorter in height than at least one of the plurality of posts of the waveguide component such that the at least one feed line termination post does not physically contact the feed when the waveguide module is assembled. In some cases, a width of a side of the at least one termination post adjacent to the waveguide may larger than a width of a side of at least one post of the other plurality of posts of the waveguide component adjacent to the waveguide. That is, in some embodiments, the at least one termination post may be generally wider along a side of the waveguide than other posts defining the waveguide. In various embodiments, a plurality of termination posts may be employed. In further embodiments, a plurality of rows of termination posts may be employed, which may or may not be staggered relative to each other.

In some embodiments, the waveguide may further comprise a ridge formed within at least a portion of the waveguide. For example, the waveguide component may comprise a ridge formed within at least a portion of the waveguide between the at least a first row of posts defining the first side of the waveguide and the at least a second row of posts defining the second side of the waveguide opposite the first side of the waveguide.

In some embodiments, at least a portion of the ridge may be more prominent and/or otherwise extend further into the waveguide than other portions of the ridge. For example, the at least a portion of the ridge that is more prominent than other portions of the ridge may formed such that the more prominent portion of the ridge is disposed, at least in part, over the resonating patch in the waveguide module. In some embodiments, the more prominent portion of the ridge may, at least in part, help to guide electromagnetic energy radiated from the resonating patch in the direction of the waveguide output of the waveguide module. In some embodiments, a transition, and/or portions thereof, between the more prominent portion of the ridge and the other portions of the ridge may be sloped and/or stepped.

In some embodiments, a waveguide module, that may be included in a vehicle radar system, may comprise a resonating patch coupled to a feed input of the waveguide module by a feed and a waveguide component coupled to the feed component. The resonating patch may comprise one or more of a square resonating patch, a rectangular resonating patch, a circular resonating patch, a triangular resonating patch, an elliptical resonating patch, a hexagonal resonating patch, a pentagonal resonating patch, a rhomboid resonating patch, a ring resonating patch (e.g., a square and/or circular ring resonating patch and/or the like) and/or any other suitable configured and/or dimensioned resonating patch.

The waveguide component may comprise a plurality of posts that, at least in part, define a waveguide. In some embodiments, the plurality of posts may comprise at least a first row of posts defining a first side of the waveguide and at least a second row of posts defining a second side of the waveguide.

The waveguide component may be coupled to the feed component in a manner such that the resonating patch feeds electromagnetic energy into the waveguide. Electromagnetic energy may be provided to the resonating patch by the feed via, for example, direct feed (e.g., via a strip feed and/or microstrip feed and/or the like) and/or electromagnetic coupling feed (e.g., proximity coupling, aperture coupling, and/or the like).

A ridge may be disposed within at least a portion of the waveguide. In some embodiments, the ridge may comprise a prominent portion that is disposed, at least in part, over the resonating patch within the waveguide configured to guide electromagnetic energy radiated by the resonating patch within the waveguide towards a waveguide output of the waveguide module. In some embodiments, a transition between the prominent portion and other portions of the ridge may comprise at least one of a stepped transition and a smooth transition.

In some embodiments, a waveguide module of a vehicle radar system may comprise a feed component including a resonating patch coupled to a feed port of the waveguide module by a microstrip feed line. The resonating patch may be configured to radiate electromagnetic energy provided to the resonating patch via the feed port and the microstrip feed line directly into a waveguide.

The waveguide module of the vehicle radar system may further comprise a waveguide component defining in part a waveguide port of the waveguide module. The waveguide component may comprise at least a first row of posts defining a first side of the waveguide and at least a second row of posts defining a second side of the waveguide. A ridge formed by the waveguide component may comprise a ridge disposed within at least a portion of the waveguide between the at least a first row of posts and the at least a second row of posts. In some embodiments, the ridge may comprise a prominent portion disposed in a location over the resonating patch within the waveguide. The ridge may be configured to guide electromagnetic energy radiated by the resonating patch within the waveguide defined by the waveguide component towards the waveguide port.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be best understood by reference to the drawings, wherein like parts may, in certain instances, be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

FIGS. 1-4 depict a waveguide module 100 that may be incorporated into and/or otherwise used with a vehicle sensor, such as a radar sensor assembly, according to some embodiments. Waveguide module 100 comprises a feed component 102 that defines, either in whole or in part, one or more elements configured to radiate electromagnetic energy such as, for example, a resonating patch 106. The antenna module 100 may further comprise a waveguide component 104 that may, at least in part, define a waveguide configured to guide the propagation of electromagnetic energy radiated from the resonating patch 106 within the waveguide.

It should be understood that although, in preferred embodiments, any number of antennae may be provided by an associated waveguide module and therefore any desired number of corresponding antennae structures—such as a plurality of radiating elements, waveguides, etc.—may be provided, it is contemplated that some embodiments may comprise an array having a single resonating element and therefore only a single waveguide, for example.

The feed component 102 may comprise a plurality of layers. For example, the feed component 102 may comprise a conductive top layer 108, a conductive ground layer 112, and a substrate layer 110 disposed therebetween. In some embodiments, the conductive layers 108, 112 may comprise metal such as, for example, copper, and/or any other suitable conductive material. The substrate layer 110 may comprise a non-conductive material and/or dielectric such as, for example, resin impregnated woven fiberglass cloth and/or the like. In some embodiments, the conductive top layer 108, a conductive ground layer 112, and substrate layer 110 may comprise layers of a PCB.

The conductive top layer 108 of the feed component 102 may comprise a first portion 114 defining a resonating element such as, for example, a resonating patch 106. The resonating patch 106 may be configured to radiate electromagnetic energy within a waveguide defined, at least in part, by the waveguide component 104, as described in more detail below. It will be appreciated that a variety of suitable types and/or configurations of resonating patches may be used in connection with the disclosed embodiments. For example, the resonating patch 106 may comprise a square patch, a rectangular patch, a circular patch, a triangular patch, an elliptical patch, a hexagonal patch, a pentagonal patch, a rhomboid patch, a ring patch (e.g., a square and/or circular ring patch and/or the like), and/or any other suitable configured patch having any suitable dimensions, configurations, and/or shapes.

Electromagnetic energy may be provided to resonating patch 106 from a feed input 118 of the waveguide module 100, which may comprise a feed port, via a feed. As shown, in some embodiments, the feed may comprise a feed line 120 coupled with the resonating patch 106. In some embodiments, the feed line 120 may comprise a microstrip feed line. It will be appreciated that a variety of other suitable methods and/or configurations for providing electromagnetic energy to the resonating patch 106 from the feed input 118 may also be used. For example, the feed may comprise a coplanar waveguide, a microstrip feed line, a strip feed line, an aperture coupled feed, a proximity coupled feed, a coaxial feed, and/or any other suitable feed employing any suitable methods and/or configurations for providing electromagnetic energy to the resonating patch 106. In various embodiments, the feed may employ a variety of techniques for providing electromagnetic energy to the resonating patch 106. For example, in some embodiments, the feed may provide electromagnetic energy to the resonating patch 106 via a microstrip feed and aperture coupling. In further embodiments, the feed may provide electromagnetic energy to the resonating patch 106 via a strip feed and aperture coupling.

In some embodiments, the feed may electrically couple the feed input 118 with the resonating patch 106 and be configured to directly feed the resonating patch 106 with electromagnetic energy provided to the feed input 118. For example, as shown, the feed may be defined by the first portion 114 of the conductive top layer 108 of the feed component 102 and be electrically connected with the resonating patch 106, which may also be defined by the first portion 114 of the conductive top layer 108. For example, the first portion 114 of the conductive top layer 108 may define a microstrip line 120 electrically coupling the resonating patch 106 with the feed input 118 of the waveguide module 100.

Other methods and/or configurations may be used to feed the resonating patch 106. For example, in various embodiments, the feed may be configured to provide electromagnetic energy to the resonating patch 106 via electromagnetic coupling instead of direct electrical connection. For example, the feed may comprise a proximity coupled feed structure configured to feed electromagnetic energy to the resonating patch 106 via electromagnetic coupling between the resonating patch 106 and a feed structure, which may itself comprise a resonating patch and/or another suitable resonating element fed via any suitable technique and/or combination of techniques (e.g., strip and/or microstrip feed). In some embodiments, the feed may be defined in one or more other layers and/or structures forming the feed component 102. For example, the feed component 102 may comprise a plurality of additional PCB layers that may form feed structures (e.g., feed lines, feed resonating elements, etc.) that may feed the resonating patch 106 with electromagnetic energy.

The conductive top layer 108 of the feed component 102 may further comprise a second portion 116. The second portion 116 may be electrically isolated from the first portion 114 and be electrically coupled to the conductive ground layer 112 of the feed component 100. For example, one or more conductive vias 122 may be defined in the substrate 110 of the feed component 102 that electrically couple the second portion 116 of the conductive top layer 108 of the feed component 102 with the conductive ground layer 112 of the feed component 102. In certain embodiments, the one or more conductive vias 122 may be formed to surround and/or otherwise "fence" at least a portion of the first portion 114 of the conductive top layer 108. For example, as shown, the one or more conductive vias 122 may be formed to surround at least a portion of the resonating patch 106 and/or the microstrip feed line 120. In the depicted embodiment, each of these vias 122 is spaced apart from adjacent vias 122 evenly and is spaced a consistent distance from the edge of second portion 116 adjacent to microstrip line 120 and resonating patch 106, but this need not be the case in other embodiments. In further embodiments, the vias 122 may fence one side of the resonating patch 102 and/or the feed line 120. In some embodiments, the one or more conductive vias 122 may be configured to electrically ground the second portion 116 of the conductive top layer 108 surrounding the resonating patch 106 and/or feed line 120.

Various layers and/or structures included in the feed component 102 may be formed using a suitable variety of techniques and or methods. For example, chemical and/or mechanical etching and/or machining techniques may be used to form resonating patch 106, the feed line 120 and/or any other suitable feed structures (e.g., feed lines and/or resonating feed elements), vias 110, and/or the like, among other techniques.

The waveguide module 100 may further comprise a waveguide component 104 that may be coupled with feed component 102 to allow the resonating patch 106 of the feed component 102 to directly feed electromagnetic energy into one of the waveguides defined therein. In some embodiments, the waveguide component 104 may define, at least in part, one or more waveguides configured to guide the propagation of electromagnetic energy radiated by the resonating patch 106. Consistent with various disclosed embodiments, in the assembled waveguide module 100, the resonating patch 106 of the feed component 102 may directly feed electromagnetic energy into one or more waveguides defined, at least in part, by the waveguide component 104.

In preferred embodiments, the waveguide component 104 may comprise a casting, such as a casting comprising a Zinc or other suitable preferably metal material. However, in other contemplated embodiments, waveguide component 104 may instead, or in addition, comprise a plastic or other material. In some such embodiments, metallic inserts, coatings, or the like may be used if desired. In typical sensor assemblies, which, as previously mentioned, may be configured specifically for use in connection with vehicles, other structures may be combined with the waveguide component 104. For example, various structural elements and/or other waveguide structures may be coupled and/or integrally formed with the waveguide component 104 in some embodiments, in some cases along with other layers and/or elements that are not depicted herein to avoid obscuring the disclosure, to form the waveguide module 100.

In some embodiments, the one or more waveguides of the waveguide component 104 may be, at least partially or wholly, defined by a plurality of posts 124-130 formed by the waveguide component 104. In some embodiments, the plurality of posts 124-130 may comprise a first row of posts 124 defining a first side of the waveguide and a second row of posts 126 defining a second side of the waveguide opposite the first side of the waveguide. In various embodiments, the first row of posts 124 and the second row of posts 126 may, at least in part, guide electromagnetic energy radiated from the resonating patch 106 within the waveguide towards a waveguide output 132 of the waveguide module 100.

In some embodiments, waveguides defined, at least in part, by the waveguide component 104 may curve about the waveguide component 104 rather than be formed in a linear configuration as illustrated. In addition, although the waveguide in the depicted embodiments is defined by rows of posts, it should also be understood that waveguides may be defined in alternative ways in other embodiments, such as by forming a channel within a solid structure of the waveguide component 104 (i.e., no posts extending up from the structure), or in any other suitable manner available to those of ordinary skill in the art. For example, in some embodiments, the waveguide may be formed by a plurality of waveguide structures of the waveguide component 104 where each waveguide structure forms a side of an associated channel. Such waveguide structures may comprise one or more posts as disclosed herein and/or continuous portions that may not necessarily comprise posts. It should also be apparent that several of the accompanying figures depict only certain elements and/or aspects of antenna assemblies and/or waveguides and that, in order to properly function, other elements may need to be provided in a complete assembly/module.

The waveguide component 104 may further comprise one or more termination posts 128. In some embodiments, the one or more termination posts 128 may be formed at an end of the waveguide defined by the waveguide component 104 opposite a waveguide output 132 of the waveguide module 100 that, in some cases, may comprise a waveguide port. In various embodiments, the one or more termination posts 128 may be configured to mitigate and/or substantially mitigate the propagation of electromagnetic radiation within the waveguide toward the feed input 118 of the waveguide module 100. In this manner, the at least one termination post 128 may, at least in part, operate to guide electromagnetic energy within the waveguide of the waveguide module 100 towards the waveguide output 132.

Figure 1:
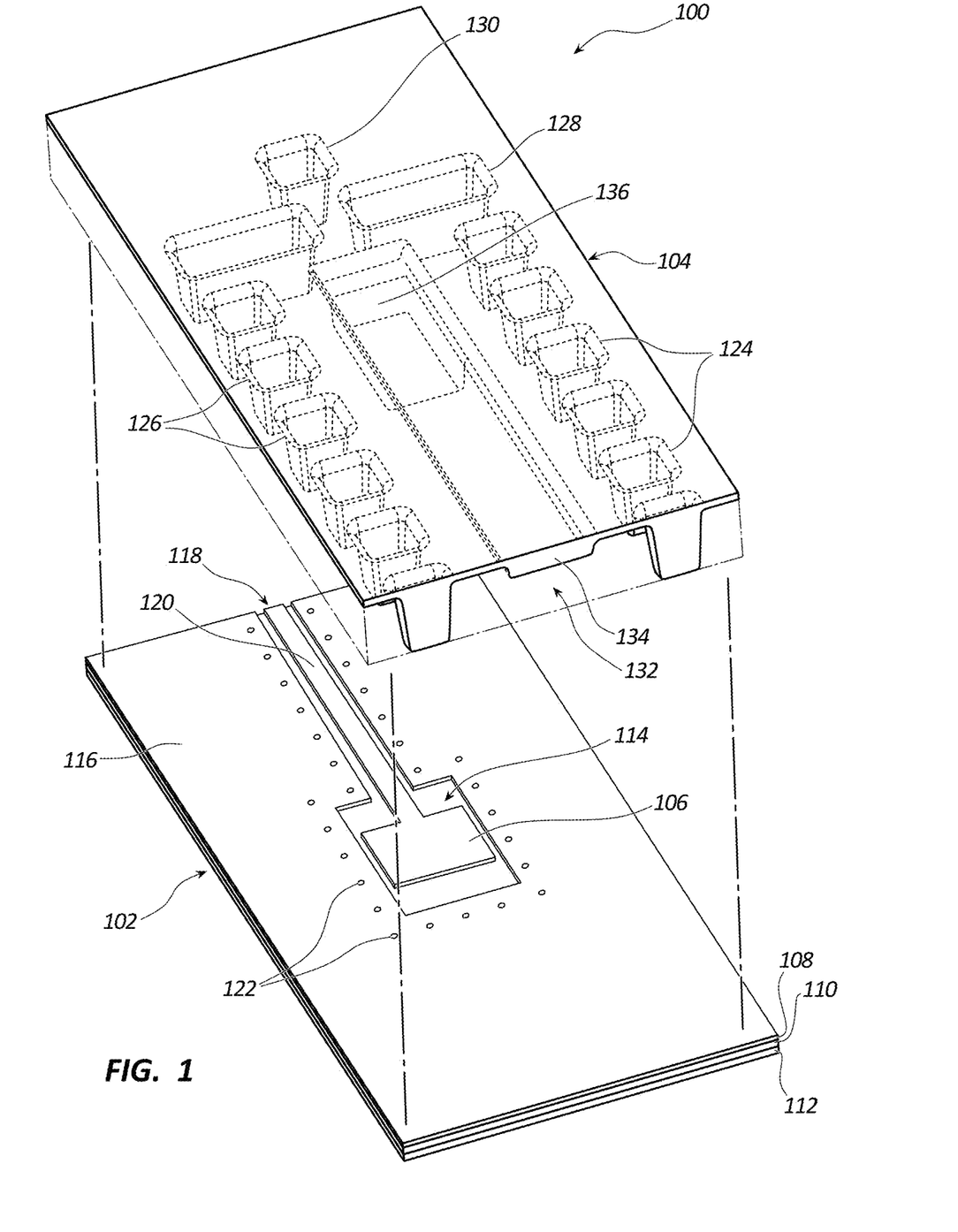
FIG. 1 is an exploded, perspective view of a waveguide module that may be incorporated in a vehicle radar sensor assembly, according to some embodiments.
Figure 2:
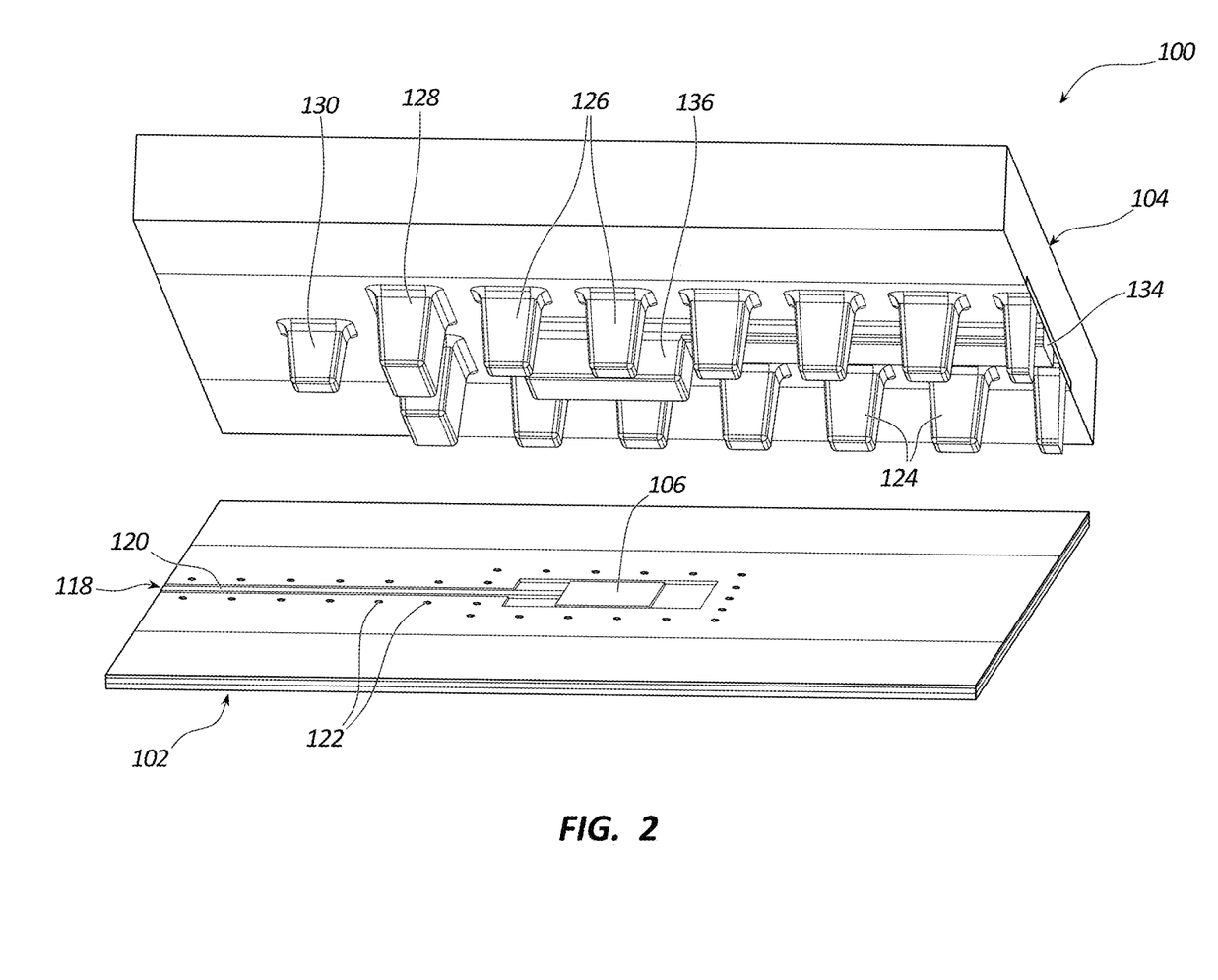
FIG. 2 is another exploded perspective view of the waveguide module of FIG. 1 showing various structures of the waveguide component.
Figure 3:
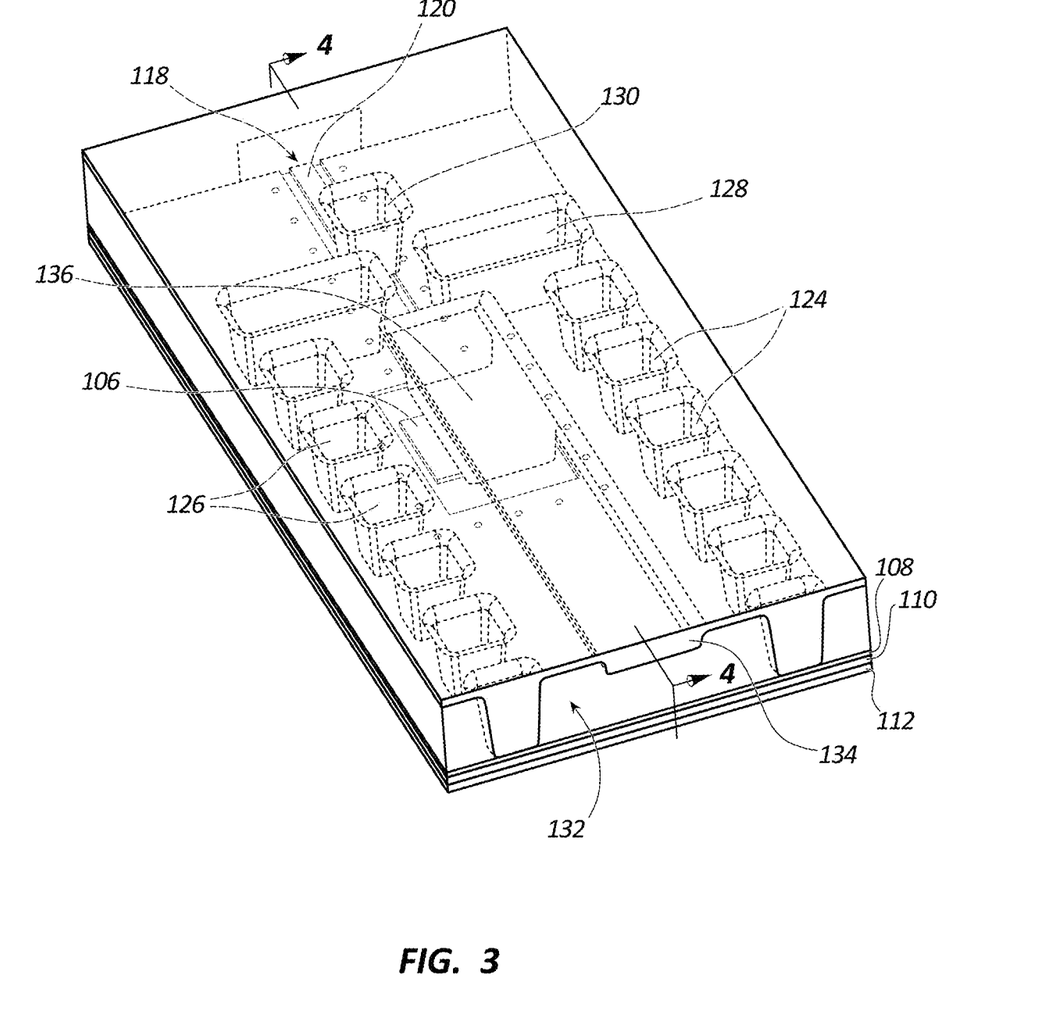
FIG. 3 is a perspective view of the waveguide module of FIGS. 1 and 2.

The one or more termination posts 128 may, in some embodiments, be formed on the waveguide component 104 such that the termination posts 128 are proximate to the feed (and/or a feed line 120 associated with the same) of the assembled waveguide module 100. For example, as shown in various figures, one or more termination posts 128 may "straddle" a feed line 120 when the waveguide module 100 is assembled adjacent to opposing sides of feed line 120, as best shown in FIG. 3. In some embodiments, a plurality of termination posts 128 may be employed. Furthermore, in various embodiments, the waveguide component 104 may further include one or more feed line termination posts 130, as described in more detail below.

In some embodiments, the various dimensions, spacing, and/or configurations of the posts 124-130 of the waveguide component 104 may vary and/or depend in part on associated methods for manufacturing the waveguide component 104. For example, as illustrated in various figures, the posts 124-130 may be tapered (with wider bases than tops) to aid in removal of the waveguide component 104 from an associated mold during a casting process used to form the waveguide component 104. In another example, in some cases, a width of a side of the at least one termination post 128 adjacent to the waveguide defined, at least in part, by the waveguide component 104 may be larger than a width of a side of at least one post of the plurality of posts 124, 126 of the waveguide component 104 forming the sides of the waveguide. Manufacturing process tolerances and/or feature resolutions may result in posts 124-130 that are either wider and/or narrower than the various posts 124-130 shown in the figures.

In some embodiments, the posts 124-130 may be integrally formed with a plate or block associated with the waveguide component 104. That is, each of the elements of the waveguide component 104 may be integrally formed in a single layer and/or block element and/or casting. In other embodiments, one or more of posts 124-130 may be separately formed and coupled using any suitable technique to form the waveguide component 104. For example, a casting may define posts 124-130 and/or other elements of the waveguide component 104 and another layer may be coupled to the casting to form the assembled waveguide component 104.

Additionally, in some embodiments, the various dimensions, spacing, and/or configurations of the posts 124-130 of the waveguide component 104 may vary and/or depend in part on desired electromagnetic propagation behavior within the waveguide defined, at least in part, in part by the waveguide component 104. For example, in some embodiments the specific spacing, configuration, and/or width of the posts 124-130 may be selected to facilitate propagation of electromagnetic energy radiated from the resonating patch 106 within the waveguide to the waveguide output 132 of the waveguide module 100. Therefore, it will be appreciated that the illustrated post dimensions, configurations, and/or spacing should be viewed as illustrative and not restrictive.

In some embodiments, the termination posts may comprise one or more feed line termination posts 130. When the waveguide module 100 is assembled, the feed line termination posts 130 may be positioned over (at least partially) a feed line 120 of the feed component 102 in a manner such that the feed line termination post 130 does not contact the feed line 120 For example, in some embodiments, the feed line termination post 130 may be shorter in height than at least one of the plurality of posts 124-128 of the waveguide component 104 such that the at least one feed line termination post 130 does not physically contact (and by extension, is not electrically coupled to) the feed line 120 when the waveguide module 100 is assembled. In various embodiments, this may prevent the feed line termination post 130 from causing an electrical short between the feed line 120 and the waveguide component 104.

In various embodiments, the one or more feed line termination posts 130 may be configured to mitigate and/or substantially mitigate the propagation of electromagnetic radiation within the waveguide toward the feed input 118 of the waveguide module 100. In this manner, the at least one feed line termination post 130 may, at least in part, guide electromagnetic energy within the waveguide of the waveguide module 100 towards the waveguide output 132.

In certain embodiments, the height of posts 124-128 may be configured such that, when the waveguide module 100 is assembled, one or more of the posts 124-128 physically contact (and by extension electrically couple with) the second portion 116 of the conductive top layer 108 of the feed component 102. In this manner, the waveguide component 104 may be electrically grounded with the second portion 116 of the conductive top layer 108 and/or the conductive ground layer 112.

In some embodiments, the specific spacing, dimensions, and/or configurations of the posts 124-128 may be configured such that even if some and/or all of the posts 124-128 do not physically contact and/or electrically couple with the second portion 116 of the conductive top layer 108 of the feed component 102, propagation of electromagnetic energy radiated from the resonating patch 106 outside the waveguide defined in part by the posts 124-128 is reduced or, in some embodiments, minimized. In this manner, the electromagnetic energy propagation performance of the waveguide module 100 may be less sensitive to physical variations in the manufacturing process of the feed component 102 and/or the waveguide component 104 and/or the assembly of the various constituent components of the waveguide module 100.

In some embodiments, the waveguide component 104 may further comprise a ridge 134 formed within at least a portion of one or more of the waveguides defined therein. For example, the waveguide component 104 may comprise a ridge 134 formed within at least a portion of the waveguide between the first row of posts 124 defining the first side of the waveguide and second row of posts 126 defining the second side of the waveguide opposite the first side of the waveguide. Electromagnetic energy radiated from the resonating patch 106 may travel within the waveguide defined by the posts 124-130 and ridge 134 and may be transmitted through waveguide output 132 of the waveguide module 100.

In some embodiments, ridge 134 may be preferred to enhance the characteristics of the waveguide by further facilitating guidance of electromagnetic energy as desired and/or for satisfying size/dimensional demands. It will be appreciated, however, that other embodiments may not include a ridge 134 and/or may include a ridge 134 having a different configuration than illustrated in the various figures. For example, in some embodiments, the ridge 134 may taper or otherwise vary in width and/or height along the length, or at least a portion of the length, of the waveguide. In other embodiments, the ridge 134 may not necessarily extend along an entire length of the waveguide and may only be formed along a portion of the length of the waveguide.

In some embodiments, the ridge 134 and/or other structures of the waveguide component 104 may be configured to facilitate a transition from one waveguide cross-section to another, such as a ridge having a first cross-sectional dimension/area to another having another cross-sectional dimension/area, which may be used in a variety of contexts. For example, the ridge 134 and/or other structures of the waveguide component 104 may be configured to couple the 132 of the waveguide module 100 with another waveguide structure in a manner that provides a gradual transition between adjacent waveguides and/or other antennae structures so as to keep reflections low.

In some embodiments, at least a portion 136 of the ridge 134 may be more prominent and/or otherwise extend further into the waveguide than other portions of the ridge. For example, the portion 136 of the ridge 134 that is more prominent than other portions of the ridge 134 may formed such that the prominent portion 136 of the ridge 134 is disposed, at least in part, over the resonating patch 106 when the waveguide module 100 is assembled. In some embodiments, the prominent portion 136 of the ridge 134 may, at least in part, help to guide electromagnetic energy radiated from the resonating patch 106 within the waveguide formed in part by the waveguide component 104 towards the waveguide output 132 of the waveguide module 100.

Figure 4:
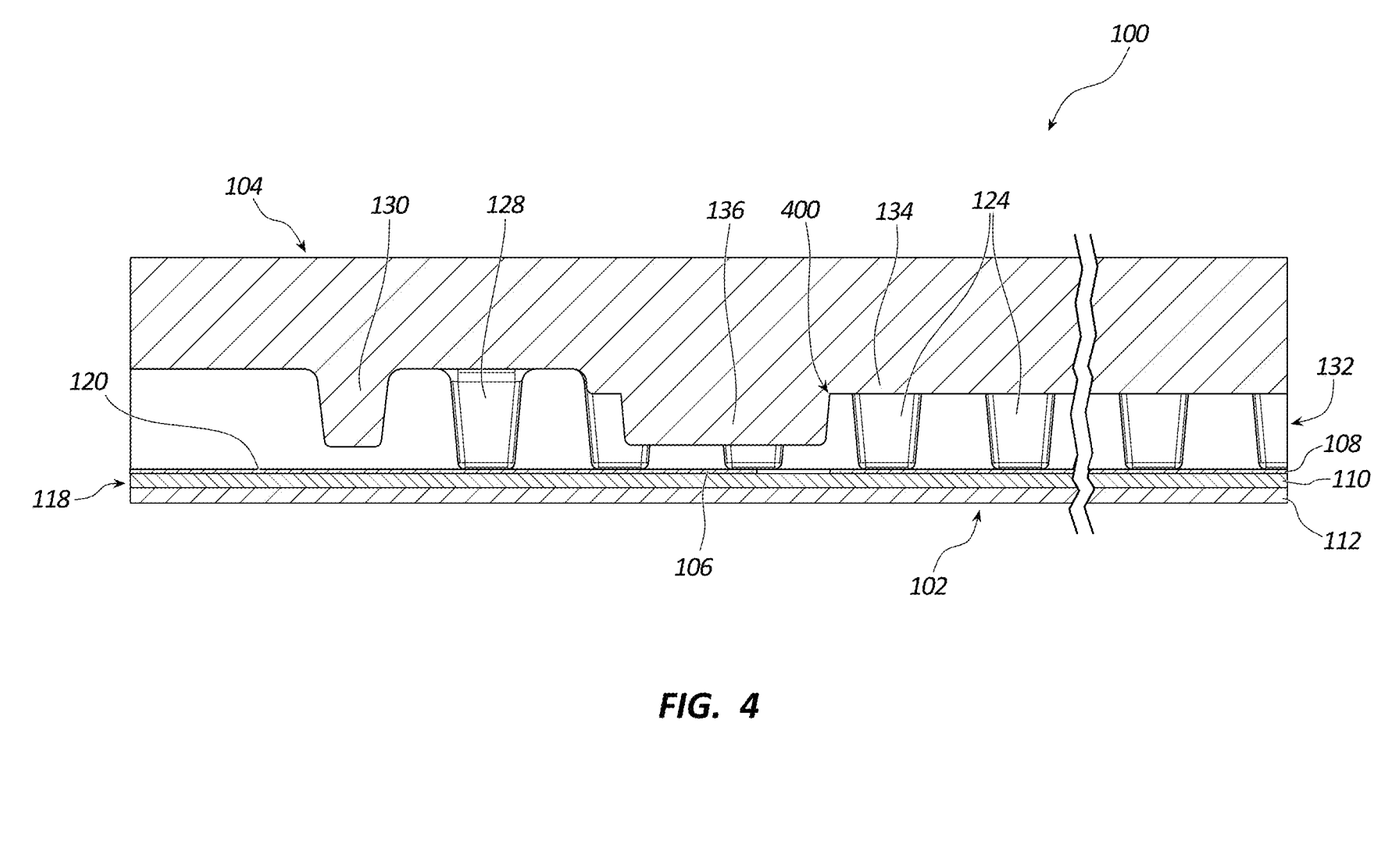
FIG. 4 is a cross sectional side view of the waveguide module of FIGS. 1-3.

As can readily be seen in FIG. 4, in some embodiments, a transition 400 between the prominent portion 136 and other portions of the ridge 134 may be stepped. Although a single step is shown in the figures, in other embodiments, a plurality of steps may be included in the transition 400 between the prominent portion 136 and other portions of the ridge 134.

The waveguide module 100 and/or its constituent components may be assembled in a variety of ways. For example, adhesives, tapes, solder, heat stakes, screws, other fasteners, and/or the like may be used to secure and/or otherwise couple the feed component 102 to the waveguide component 104. In some embodiments, one or more pins, tables, and/or other alignment structures may be used to facilitate proper alignment of the feed component 102 relative to the waveguide component 104 during assembly of the waveguide module 100. In some embodiments, these alignment structures may be integrally formed into the feed component 102 and/or the waveguide component 104. In further embodiments, alignment structures and/or components separate from the feed component 102 and/or the waveguide component 104 may be used.

Figure 5:
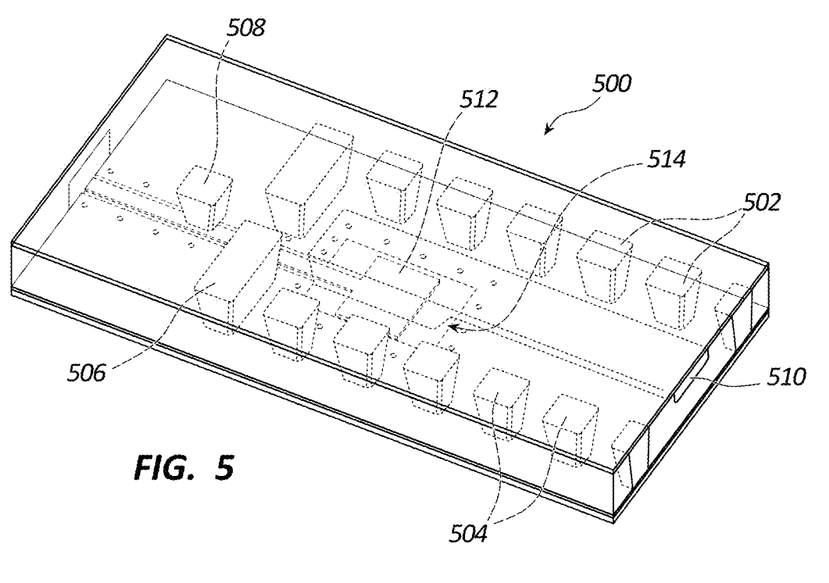
FIG. 5 is a perspective view of a waveguide module including a waveguide with a ridge comprising a sloped ridge transition consistent with some embodiments.

In further embodiments, such as that of FIG. 5, a waveguide module 500 may comprise a waveguide defined, at least in part, by posts 502-508 that includes a ridge 510 within the waveguide. The ridge 510 may include a portion 512 that is more prominent than other portions of the ridge 510. The prominent portion 512 of the ridge may be disposed, at least in part, over a resonating patch of the waveguide module 500 and may help to guide electromagnetic energy radiated from the resonating patch within the waveguide. In can be seen in FIG. 5, in some embodiments, a transition 514 between the prominent portion 512 and other portions of the ridge 510 may be sloped and/or otherwise be smooth.

Figure 6:
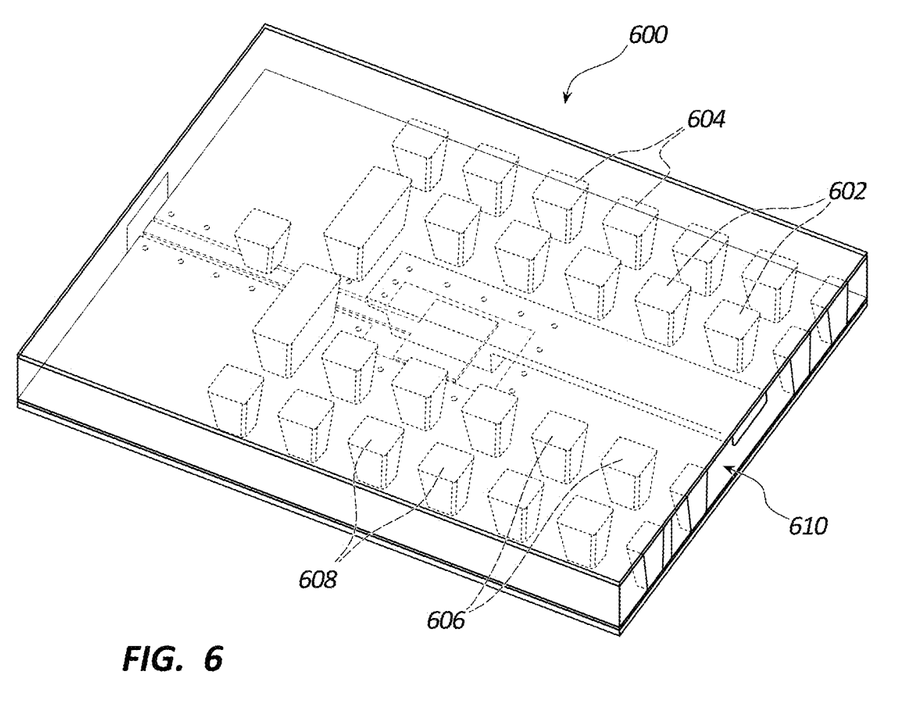
FIG. 6 is a perspective view of a waveguide module including a plurality of rows of posts defining sides of a waveguide consistent with further embodiments.

In various embodiments, a plurality of rows of posts may be formed in a waveguide component that define, at least in part, the sides of a waveguide. For example, as shown in FIG. 6, a waveguide module 600 may include two rows of posts 602/604 and 606/608, respectively, formed in the waveguide component on each side of the waveguide. Specifically, a first side of the waveguide may be formed by a first row of posts 602 and a second row of posts 604. Similarly, a second side of the waveguide may be formed by a first row of posts 606 and a second row of posts 608.

In some embodiments, the rows of posts 602, 604 and 606, 608 (or portions thereof) may be aligned, or at least substantially aligned, relative to each other. For example, adjacent posts on one side of the waveguide may be aligned, or at least substantially aligned with posts in the adjacent row on the same side. In other words, the space between each adjacent post in row 602 may be aligned with the space in between each adjacent post in row 604. Similarly, the space between each adjacent post in row 606 may be aligned with the space between each adjacent post in row 608.

In some embodiments, the rows of posts 602/604 and 606/608 (or portions thereof) may be staggered, or at least substantially staggered, relative to each other. For example, posts of row 602 may be positioned adjacent to gaps between adjacent posts of row 604. Similarly, posts of row 606 may be positioned adjacent to gaps between adjacent posts of row 608.

Using a plurality of rows of posts on each side may, in certain embodiments, facilitate improved confinement of electromagnetic energy within the waveguide defined, at least in part, by the waveguide component of waveguide module 600. For example, using a plurality of rows of posts on each side of the waveguide may help to mitigate leakage of electromagnetic energy from the waveguide and/or may otherwise improve the guidance of the propagation of electromagnetic energy radiated from the resonating patch within the waveguide towards the waveguide output 610.

Figure 7:
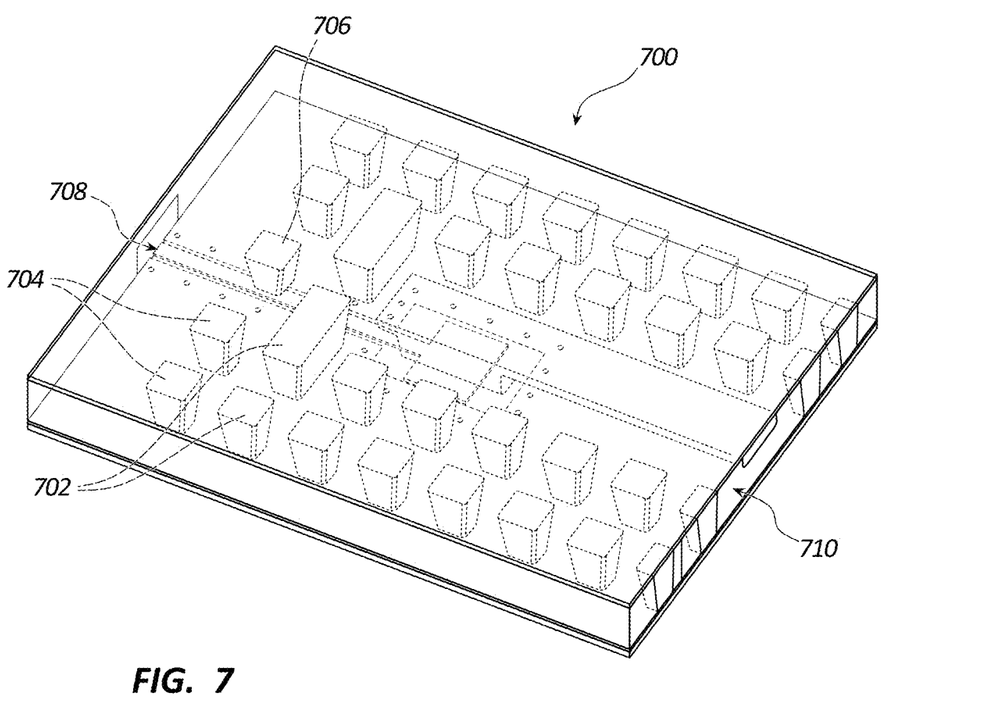
FIG. 7 is a perspective view of a waveguide module including a plurality of rows of termination posts defining an end of a waveguide consistent with other embodiments.

In further embodiments, a plurality of rows of termination posts may be employed, which may or may not be staggered relative to each other. For example, as shown in FIG. 7, a waveguide module 700 comprises two rows of termination posts 702, 704 (that may include feed line termination post 706) formed in the waveguide component. In some embodiments, the rows of termination posts 702, 704 (or portions thereof) may be aligned, or at least substantially aligned, relative to each other. In other embodiments, rows of termination posts 702, 704 (or portions thereof) may be staggered, or at least substantially staggered, relative to each other. Termination posts 702, 704 and/or feed line termination post 706 may, in some embodiments, operate to mitigate the propagation of electromagnetic energy within the waveguide in a direction of a feed port 708 of the waveguide module 700 and/or otherwise guide electromagnetic energy within the waveguide in a direction of a waveguide port 710 of the waveguide module 700.

Again, it should be understood that in some embodiments, the various dimensions, spacing, and/or configurations of the posts of the waveguide assemblies illustrated in various figures and described herein may vary and/or depend in part on desired electromagnetic propagation behavior of the waveguide module and/or the waveguide and/or associated manufacturing techniques. Therefore, it will be appreciated that the illustrated post dimensions, configurations, and/or spacing should be viewed as illustrative and not restrictive.

It should also be understood that whereas preferred embodiments may be used in connection with vehicle sensors, such as vehicle radar modules or the like, the principles disclosed herein may be used in a wide variety of other contexts, such as other types of radar assemblies, including such assemblies used in aviation, maritime, scientific applications, military, and electronic warfare. Other examples include point-to-point wireless links, satellite communication antennas, other wireless technologies, such as 5G wireless, and high-frequency test and scientific instrumentation. Thus, the principles disclosed herein may be applied to any desired communication sub-system and/or high-performance sensing and/or imaging systems, including medical imaging, security imaging and stand-off detection, automotive and airborne radar and enhanced passive radiometers for earth observation and climate monitoring from space.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present inventions should, therefore, be determined only by the following claims.

The invention claimed is:

1. A waveguide module, comprising:
    a feed component, the feed component comprising a conductive ground layer, a conductive top layer, and a substrate disposed between the conductive ground layer and the conductive top layer, the conductive top layer comprising:
        a first portion defining a resonating patch coupled to a feed input of the waveguide module by a feed, and
        a second portion conductively isolated from the first portion and coupled to the conductive ground layer by a plurality of conductive vias defined in the substrate; and
    a waveguide component, the waveguide component comprising a plurality of posts, the plurality of posts at least in part defining a waveguide, the waveguide component being coupled with the feed component such that the resonating patch directly feeds the waveguide, the waveguide defining a waveguide output of the waveguide module, and wherein the plurality of posts comprises:
        at least a first row of posts defining a first side of the waveguide; and
        at least a second row of posts defining a second side of the waveguide opposite the first side of the waveguide.

2. The waveguide module of claim 1, wherein the at least a first row of posts and the at least a second row of posts each comprise a plurality of rows of posts.

3. The waveguide module of claim 1, wherein the waveguide component further comprises at least one termination post.

4. The waveguide module of claim 3, wherein the at least one termination post comprises at least one feed line termination post disposed proximate to the feed line.

5. The waveguide module of claim 4, wherein the at least one feed line termination post is shorter in height than at least one of the plurality of posts of the waveguide component such that the at least one feed line termination post does not physically contact the feed line.

6. The waveguide module of claim 1, wherein the waveguide component further comprises a ridge disposed within at least a portion of the waveguide.

7. The waveguide module of claim 6, wherein at least a portion of the ridge is more prominent than other portions of the ridge, the at least a portion of the ridge being disposed, at least in part, over the resonating patch.

8. The waveguide module of claim 7, wherein a transition between the at least a portion of the ridge and the other portions of the ridge comprises at least one of a sloped transition and a stepped transition.

9. The waveguide module of claim 1, wherein the plurality of conductive vias are configured to surround at least a part of the first portion of the feed component.

10. The waveguide module of claim 1, wherein the conductive ground layer, the conductive top layer, and the substrate of the feed component comprise printed circuit board layers.

11. The waveguide module of claim 1, wherein the feed is defined by the first portion of the conductive top layer.

12. The waveguide module of claim 1, wherein the resonating patch comprises at least one of a square resonating patch, a rectangular resonating patch, a circular resonating patch, a triangular resonating patch, an elliptical resonating patch, a hexagonal resonating patch, a pentagonal resonating patch, a rhomboid resonating patch, and a ring resonating patch.

13. The waveguide module of claim 1, wherein the feed comprises at least one of a coplanar wave guide, a microstrip feed line, a strip feed line, an aperture coupled feed, a proximity coupled feed, and a coaxial feed.

14. A waveguide module, comprising:
    a feed component, the feed component comprising a conductive ground layer, a conductive top layer, and a substrate disposed between the conductive ground layer and the conductive top layer, the conductive top layer comprising:
        a first portion defining a resonating patch coupled to a feed input of the waveguide module by a feed, and
        a second portion conductively isolated from the first portion and coupled to the conductive ground layer by a plurality of conductive vias defined in the substrate; and
    a waveguide component, the waveguide component comprising a plurality of posts, the plurality of posts at least in part defining a waveguide, the waveguide component being coupled with the feed component such that the resonating patch directly feeds the waveguide, the waveguide defining a waveguide output of the waveguide module, and wherein the waveguide component further comprises at least one termination post.

15. The waveguide module of claim 14, wherein the at least one termination post comprises at least one feed line termination post disposed proximate to the feed line.

16. The waveguide module of claim 15, wherein the at least one feed line termination post is shorter in height than at least one of the plurality of posts of the waveguide component.

17. A waveguide module, comprising:
    a feed component, the feed component comprising a conductive ground layer, a conductive top layer, and a substrate disposed between the conductive ground layer and the conductive top layer, the conductive top layer comprising:
        a first portion defining a resonating patch coupled to a feed input of the waveguide module by a feed, and
        a second portion conductively isolated from the first portion and coupled to the conductive ground layer by a plurality of conductive vias defined in the substrate; and
    a waveguide component, the waveguide component comprising a plurality of posts, the plurality of posts at least in part defining a waveguide, the waveguide component being coupled with the feed component such that the resonating patch directly feeds the waveguide, the waveguide defining a waveguide output of the waveguide module, wherein the waveguide component further comprises a ridge disposed within at least a portion of the waveguide, and wherein at least a portion of the ridge is more prominent than other portions of the ridge, the at least a portion of the ridge being disposed, at least in part, over the resonating patch.

18. The waveguide module of claim 17, wherein the waveguide component further comprises at least one termination post.

19. The waveguide module of claim 18, wherein the at least one termination post comprises at least one feed line termination post disposed proximate to the feed line.

20. The waveguide module of claim 17, wherein a transition between the at least a portion of the ridge and the other portions of the ridge comprises at least one of a sloped transition and a stepped transition.

\* \* \* \* \*

UNITED STATES PATENT AND TRADEMARK OFFICE
CERTIFICATE OF CORRECTION

PATENT NO. : 10,957,971 B2  
APPLICATION NO. : 16/520223  
DATED : March 23, 2021  
INVENTOR(S) : Scott B. Doyle et al.

Page 1 of 1

It is certified that error appears in the above-identified patent and that said Letters Patent is hereby corrected as shown below:

On the Title Page

The cities and states of residence for Inventors Scott B. Doyle and Angelos Alexanian should appear as follows:
Scott B. Doyle, Sudbury, MA (US);
Angelos Alexanian, Lexington, MA (US)

Signed and Sealed this
Twenty-fourth Day of January, 2023

Katherine Kelly Vidal
*Director of the United States Patent and Trademark Office*